(12) United States Patent
Harvey et al.

(10) Patent No.: US 8,175,577 B1
(45) Date of Patent: May 8, 2012

(54) NON-JAMMING SECURITY ZONE ACCESS CONTROL FOR MOBILE COMMUNICATION DEVICES

(75) Inventors: Richard Lee Harvey, Branchburg, NJ (US); Renitta Burt-Geiger, Clinton, MD (US)

(73) Assignee: Cellco Partnership, Basking Ridge, NJ (US)

( * ) Notice: Subject to any disclaimer, the term of this patent is extended or adjusted under 35 U.S.C. 154(b) by 198 days.

(21) Appl. No.: 12/646,556

(22) Filed: Dec. 23, 2009

(51) Int. Cl.
*H04M 1/66* (2006.01)
*H04W 24/00* (2009.01)

(52) U.S. Cl. .................... 455/410; 455/411; 455/456.1; 455/456.5; 455/528

(58) Field of Classification Search .................. 455/410, 455/411, 528, 456.1, 456.6, 456.5
See application file for complete search history.

(56) References Cited

U.S. PATENT DOCUMENTS

2008/0057976 A1\* 3/2008 Rae et al. .................. 455/456.1
2010/0105416 A1\* 4/2010 Nadler et al. .............. 455/456.4

\* cited by examiner

*Primary Examiner* — Barry Taylor

(57) ABSTRACT

A security zone monitoring system in cooperation with a wireless communication system may control access to the wireless communication system by mobile communication devices while near or within a security zone. The wireless communication system may include a security communication system which may receive communications from the security zone monitoring system indicating the identity of each mobile communication device which has been detected and whether the mobile communication device is near or within the security zone. The wireless communication system may include a security information processing system which may disrupt access to the wireless communication system by each mobile communication device in ways which differ depending on whether a communication from the security zone monitoring system indicates that the mobile communication device is near or within the security zone.

22 Claims, 3 Drawing Sheets

NON-JAMMING SECURITY ZONE ACCESS CONTROL FOR MOBILE COMMUNICATION DEVICES

BACKGROUND

1. Technical Field

This disclosure relates to controlling access to a wireless communication system by mobile communication devices while near or within a security zone.

2. Description of Related Art

Mobile communication devices are widely available and in common use. However, their use in some areas may not be desired.

In prisons, for example, mobile communication devices are sometimes used by inmates for illegal purposes, such as to manage criminal enterprises and/or to harm or intimidate witnesses.

Efforts to prevent such problematic uses may not always be successful.

In prisons, for example, visitors may be searched and cell phones which they carry may be removed before they enter a security zone. However, these searches may not always be effective. For example, a small cell phone might be missed during a search, or a guard might be persuaded to allow a mobile communication device to enter the security zone. Searches may also not prevent mobile communication devices from being delivered into a security zone using airborne projectiles.

Dogs have also been trained to locate cell phones by their smell. The effectiveness of such an approach, however, may not yet have been proven. Even when a cell phone is uncovered and removed, moreover, the supply of such devices may be so plentiful as to enable it to be easily replaced.

Detectors have been set up to detect the transmission of communications from wireless communication devices. Cameras have then been activated in an effort to search for the users of these devices. Again, however, the procedure may not be entirely effective. And, again, a confiscated phone may be easy to replace.

Local jamming is another approach which has been employed. However, it may be difficult and/or expensive to restrict the jamming to only the secured area. As a consequence, mobile communication devices outside of the secured area may also be jammed. In an effort to minimize excessive jamming, the jamming level may be set low, but this may reduce the effectiveness of the jamming within the security zone. Users within the security zone who should be permitted to use mobile communication devices (e.g., prison guards), moreover, may also be blocked from doing so.

Microcellular communication cellular systems have also been used to manage communications within a security zone. However, these systems may be costly and may interfere with a global wireless communication system that otherwise would manage these communications.

SUMMARY

An access control system may control access to a wireless communication system by mobile communication devices while near or within a security zone. A security communication system may receive communications from a security zone monitoring system indicating the identity of each mobile communication device which has been detected and whether the mobile communication device is near or within the security zone. A security information processing system may disrupt access to the wireless communication system by each mobile communication device in ways which differ depending on whether a communication from the security zone monitoring system indicates that the mobile communication device is near or within the security zone.

The security information processing system may disrupt access if a communication from the security zone monitoring system indicates that the mobile communication device is within the security zone and the mobile communication device is not on an allow-access list.

The security information processing system may allow access if a communication from the security zone monitoring system indicates that the mobile communication device is near but not within the security zone, unless the mobile communication device is a disrupt-access list.

The security information processing system may disrupt access if a communication from the security zone monitoring system indicates that the mobile communication device is near but not within the security zone, unless the mobile communication device is on an allow-access list. Such devices may be regularly used in a nearby office building or be operated by officials within the security zone.

The security information processing system may allow access if communications from the security zone monitoring system indicate that the mobile communication device has been near but not within the security zone, unless the communications indicate that the mobile communication device has been near the security zone for more than or at least a pre-determined period. The pre-determined period may be as short as five minutes or as long as six hours or more.

The security information processing system may allow access if communications from the security zone monitoring system indicate that the mobile communication device has been near but not within the security zone, unless the communications indicate that the mobile communication device has participated in more than or at least a pre-determined number of separately-established communications while near the security zone.

The security information processing system may allow access if communications from the security zone monitoring system indicate that the mobile communication device is near but not within the security zone, unless the communications indicate that access should be disrupted based on application of an algorithm to the communications.

The security information processing system may restore access after it has been disrupted when the access control system receives information indicating that the mobile communication device is at a location which is not near the security zone. The security information processing system may receive the information indicating that the mobile communication device is at a location which is not near the security zone from a source other than the security zone monitoring system.

The security information processing system may disrupt access by taking down any communication which is taking place; by allowing any communication which is taking place to be completed, but by disrupting subsequently-initiated communications; or by redirecting an addressed communication from the mobile communication device to a destination other than the one to which the communication was addressed, such as to a pre-recorded message indicating that access has been disrupted. The pre-recorded message may describe steps that may be taken to restore access.

A security zone monitoring system may control access to a wireless communication system by mobile communication devices while near or within a security zone. An antenna system may receive signals from the mobile communication devices. A receiver may detect signals from the mobile communication devices and extract therefrom information indicative of the identity of each detected mobile communication device and whether the mobile communication device is near or within the security zone. A carrier communication system may communicate information to an access control system within the wireless communication system indicative of the identity of each mobile communication device which has been detected and whether the mobile communication device is near or within the security zone. The receiver may not indicate the absolute location of each mobile communication device, but only whether the location is near or within the security zone.

Computer-readable storage media may contain computer programming instructions which, when executed by a wireless communication system, may cause the wireless communication system to control access to the wireless communication system by mobile communication devices while near or within a security zone.

Computer-readable storage media contain computer programming instructions which, when executed by a security zone monitoring system, may cause the security zone monitoring system to control access to a wireless communication system by mobile communication devices while near or within a security zone.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
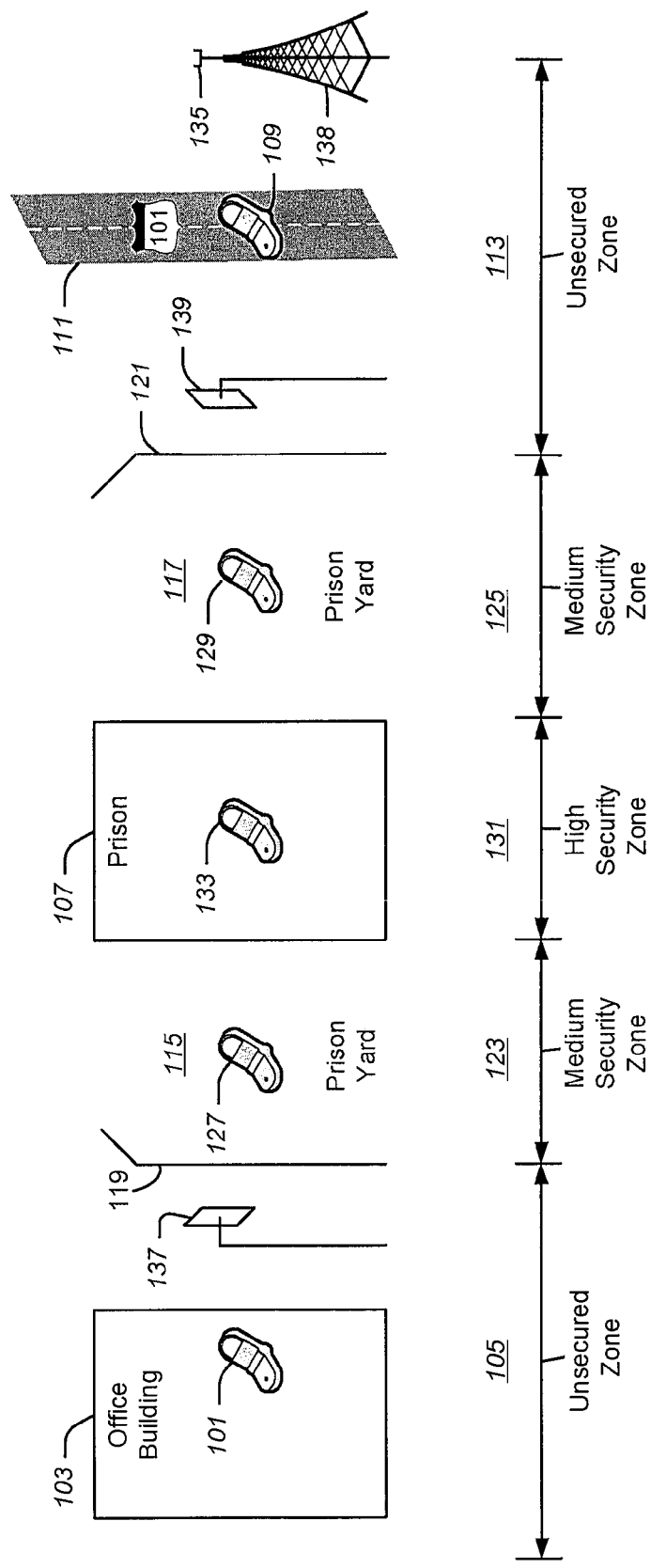
FIG. 1 illustrates mobile communication devices operating in a high security zone, neighboring medium security zones, and neighboring unsecured zones.

FIG. 1 illustrates mobile communication devices operating in a high security zone, neighboring medium security zones, and neighboring unsecured zones.

As illustrated in FIG. 1, a mobile communication device 101 may be operating in an office building 103. The office building 103 may be located in an unsecured zone 105 which may neighbor a prison 107. Similarly, a mobile communication device 109 may be used within a vehicle traveling near the prison 107 on a highway 111 in another unsecured zone 113. Prison yards 115 and 117 may be delineated by fences 119 and 121 surrounding the prison 107 and may be within neighboring medium security zones 123 and 125, respectively. A mobile communication device 127 may be operating within the medium security zone 123, and a mobile communication device 129 may be operating within the medium security zone 125. The prison 107 may be within a high security zone 131 in which a mobile communication device 133 may be operating.

Each of the mobile communication devices may be of any type. For example, each mobile communication device may consist of or include a cell phone, a PDA, and/or a laptop computer.

A wireless communication system may include one or more antennas, such as an antenna 135, located at one or more cell sites, such as a cell site 138, which may be configured to receive wireless communications from one or more of the mobile communication devices.

It may be desirable to control access to the wireless communication system by mobile communication devices while they are near or within a security zone, such as near or within the high security zone 131 illustrated in FIG. 1. The phrase "security zone" as used herein is intended to embrace any zone in which it is desired to restrict access to a wireless communication system by mobile communication devices while near or within the zone. For example, a "security zone" may be an area within a prison, or a military base. There may be mobile communication devices which should be allowed to operate near and/or within the security zone. Conversely, there may be mobile communication devices which should not be allowed to operate near and/or within the security zone. There may also be mobile communication devices near and/or within the security zone for whom an access determination has not yet been made.

Figure 2:
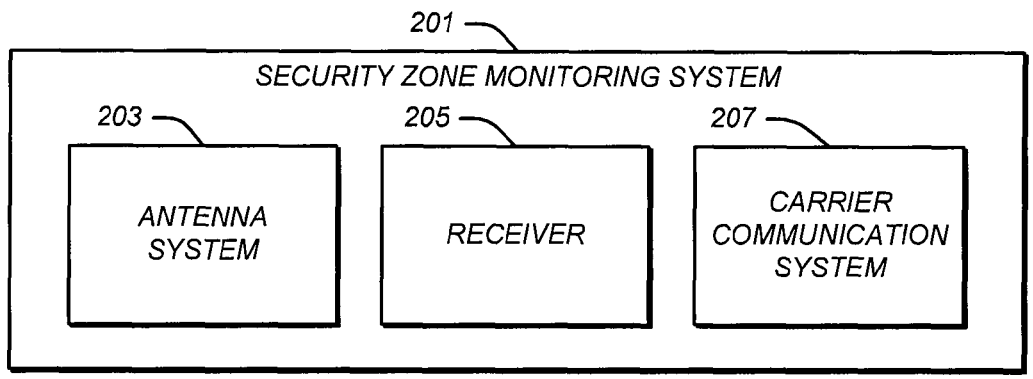
FIG. 2 illustrates a security zone monitoring system.

FIG. 2 illustrates a security zone monitoring system 201. The security zone monitoring system 201 may be configured to control access to a wireless communication system by mobile communication devices while near or within a security zone. All or portions of the security zone monitoring system may be located near or within the security zone.

The security zone monitoring system may include an antenna system 203. The antenna system 203 may include one or more antennas configured to receive signals from mobile communication devices that are near or within the security zone, but not from mobile communication devices which are far from the security zone.

An example of such an antenna system is antennas 137 and 139 illustrated in FIG. 1. As illustrated in FIG. 1, the antennas 137 and 139 may be positioned in such a way as to be protected from vandalism, such as behind the fences 119 and 121, respectively. The antennas may in addition or instead be protected by being placed at other protected locations, such as on top of a building and/or in a protective cage.

The antennas which are used in the antenna system 203 may be of any type. For example, the antennas may be sized, oriented, configured, constructed, or positioned so as to receive signals from mobile communication devices within a security zone. The antenna system may be configured not to receive signals from the mobile communication devices that are outside of the security zone, or that are at least are far from the security zone.

The antenna system 203 may be configured to receive signals from mobile communication devices which are near the security zone, such as within the unsecured zones 105 and 113 illustrated in FIG. 1. The antenna system 203 may instead be configured to be immune to signals outside of the security zone. However, this might require a more costly antenna system which may not be necessary, as will become clear from the discussion below.

The security zone monitoring system may include a receiver 205. The receiver 205 may be connected to the antenna system 203 and may be configured to detect signals from mobile communication devices whose signals are received by the antenna system 203. The receiver may be configured to extract from these detected signals information indicative of the identify of each detected mobile communication device and whether the mobile communication device is near or within the security zone. The information indicative of the identify of each mobile communication device may be generated by the mobile communication device. The information indicative of whether the mobile communication device is near or within the security zone may be generated based on triangulation and/or any other locating technology.

The antenna system 203 and the receiver 205 may be configured such that the receiver 205 may not able to determine the absolute location of each mobile communication device, but only whether each mobile communication device is near or within the security zone. In other words, the output or the receiver 205 in connection with each mobile communication device may merely indicate that the mobile communication device has been detected, its identity, and whether it is near or within the security zone. More specific location information may in addition or instead be provided by the receiver 205, but this may require a more expensive antenna system 203 and/or the receiver 205, and may not be needed for the information processing which will now be described.

Although the receiver 205 is illustrated as a single unified component, the receiver 205 may instead consist of a set of receivers at different locations. For example, each antenna which is part of the antenna system 203 may have its own, dedicated receiver, and the outputs of all of these receivers may be combined and processed to provide the information discussed above in connection with the receiver 205. In such a case, all of these distributed receivers and the combining system are considered to be the receiver 205.

The security zone monitoring system 201 may include a carrier communication system 207. The carrier communication system 207 may be configured to communicate information to an access control system within a wireless communication system indicative of the identity of each mobile communication device which has been detected by the receiver 205 and whether the mobile communication device is near or within the security zone. In other words, the carrier communication system 207 may be configured to communicate to the access control system the information about each mobile communication device which is extracted by the receiver 205 from the signals from the antenna system 203.

The carrier communication system 207 may be of any type. For example, it may be a system configured to communicate the described information over the internet and/or through any other type of network system. The carrier communication system 207 may be configured to address the delivered information to an address at which the access control system is operating, such as to a server on the internet.

Figure 3:
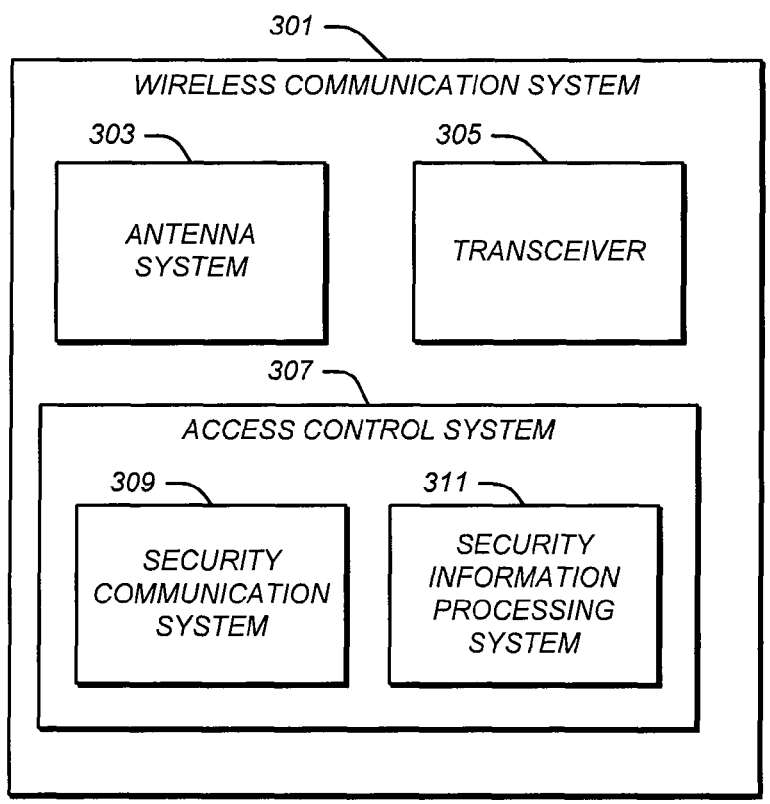
FIG. 3 illustrates a wireless communication system.

FIG. 3 illustrates a wireless communication system.

As illustrated in FIG. 3, a wireless communication system 301 may include an antenna system 303, a transceiver 305, and an access control system 307 containing a security communication system 309 and a security information processing system 311.

The wireless communication system 301 may be configured to facilitate communication between each of the mobile communication devices and other communication devices, such as one of the other mobile communication devices, a landline, and/or a data or information service. For example, the wireless communication system 301 may consist of or include a cellular communication network.

The antenna system 303 of the wireless communication system 301 may include one or more antennas configured to communicate with the mobile communication devices. The antenna system 303 may include a large number of antennas distributed across a wide area, such as a city, state, or country. Each of the antennas may be configured to deliver signals to and/or to receive signals from each of the mobile communication devices that are near or within the security zone, as well as mobile communication devices that are not near the security zone.

The transceiver 305 may be configured to deliver signals to the antenna system 303 for delivery to one or more of the mobile communication devices and/or to receive signals from the antenna system 303 that came from one or more of the mobile communication devices. The transceiver 305 may include a plurality of transceivers, each operating in conjunction with one or more of the antennas that are within the antenna system 303. The wireless communication system 301 may include routing subsystems configured to route communications to and from antennas that are closest to each communication mobile communication device.

The access control system may be configured to control access to the wireless communication system 301 by mobile communication devices while they are near or within a security zone.

The security communication system 309 may be configured to receive communications from a security zone monitoring system indicating the identity of each mobile communication device which has been detected by the security zone monitoring system and whether the mobile communication device is near or within a security zone. The security zone monitoring system 309 may be the security zone monitoring system 201 illustrated in FIG. 1 and discussed above or another type of security zone monitoring system.

The information received from the security zone monitoring system may identify the location of each mobile communication device merely by specifying whether the device is near or within the security zone. No more specific location information may be provided, such as information indicating the absolute position of the mobile communication device.

The security information processing system 311 may be configured to disrupt access to the wireless communication system 301 by each mobile communication device in ways which differ depending on whether a communication from the security zone monitoring system indicates that the mobile communication device is near or within the security zone. In other words, when the communication from the security zone monitoring system indicates that the mobile communication device is near but not within the security zone, the security information processing system 311 may be configured to disrupt access to the wireless communication system by the mobile communication device in one way. However, when the communication from the security zone monitoring system indicates that the mobile communication device is within the security zone, the security information processing system 311 may be configured to disrupt access to the wireless communication system by the mobile communication device in a different way. Examples of these different ways will now be described. Other approaches may be used in addition or instead.

When a communication from the security zone monitoring system indicates that the mobile communication device is within the security zone, the security information processing system 311 may be configured to disrupt the access of that mobile communication device to the wireless communication system, unless that mobile communication device is on an allowed-access list. Thus, access by all mobile communication devices detected by the security zone monitoring system to be within the security zone may be disrupted, except for the ones on the allowed-access list. This may ensure that communications from all wireless mobile communication devices within the security zone are disrupted, except in connection with those devices which have been pre-approved for such communications. This may ensure that the security zone is fully protected. One example of such a protected security zone may be the high security zone illustrated in FIG. 1.

When a mobile communication device is near but not within the security zone, such as mobile communication devices that may be within the unsecured zones 105 and 113 and/or the medium security zones 123 and 125 illustrated in FIG. 1, the way in which their access to the wireless communication system is interrupted may be different. Examples of these different ways are now discussed. Other approaches may be used in addition or instead If a communication from the security zone monitoring system indicates that the mobile communication device is near but not within the security zone, the security information processing system 311 may be configured to allow access, unless the mobile communication device is on a disrupt-access list.

Thus, access by mobile communication devices within the security zone may be presumptively disrupted (i.e., disrupted unless they are on an allow-access list), while communications from mobile communication devices that are near but not within the security zone may be presumptively allowed (i.e., not disrupted unless they are on a disrupt-access list).

If a communication from the security zone monitoring system indicates that the mobile communication device is near but not within the security zone, the security information processing system 311 may instead be configured to disrupt access, unless the mobile communication device is on an allow-access list. The allow-access list for mobile communication devices which are near but not within the security zone may be different from the allow-access list for mobile communication devices which are within the security zone.

The various access lists which have been described may be stored at any location, such as at the location of the security zone or at a facility which is part of the wireless communication system. The ability to add or remove mobile communication devices to or from each list may be restricted to certain persons, such as to a security officer, by appropriate security systems. For example, each access list may be made available online, but protected by a security interface which requires an authorized user name and password for access. Membership on one or more of the lists may be determined by a court, a security officer, and/or by any other means.

A mobile communication device which is used near but not within the security zone for more than the pre-determined period may likely be operated by someone who is confined to the security zone, such as a prisoner, who should not be given access to the wireless communication system. The security information processing system 311 may therefore be configured to allow access if communications from the security zone monitoring system indicate that the mobile communication device is near but not within the security zone, unless the communications indicate that the mobile communication device has been near the security zone for more than or at least a pre-determined period. The pre-determined period may be any amount, as short as five minutes or as long as six hours or more. The security information processing system 311 may be configured to always allow access if the mobile communication device is listed on an allow-access list. Conversely, the security information processing system 311 may be configured to always disrupt access if it is listed on a disrupt-access list.

A mobile communication device which is used several different times near but not within the security zone may likely be used by a person who is restricted to the security zone and thus should not be able to access the wireless communication system. The security information processing system 311 may therefore be configured to allow access if communications from the security zone monitoring system indicate that the mobile communication device is near but not within the security zone, unless the communications indicate that the mobile communication device has participated in more than or at least a pre-determined number of separately-established communications while near the security zone. For example, the security information processing system 311 may be configured to disrupt access if the mobile communication device makes more than five telephone calls. The security information processing system 311 may be configured to nevertheless always allow access if the mobile communication device is listed on an allow-access list. Conversely, the security information processing system 311 may be configured to always disrupt access if it is listed on a disrupt-access list The security information processing system 311 may be configured to disrupt access if communications from the security zone monitoring system indicate any combination of the conditions which have been described above. More generally, the security information processing system 311 may be configured to allow access to a mobile communication device that is near but not within the security zone, unless communications from the security zone monitoring system indicate that the access should be disrupted based on application of an algorithm to the communications. The algorithm may test for circumstances different than those described above.

The security information processing system 311 may be configured to disrupt access in any way. For example, the security information processing system 311 may be configured to disrupt access by taking down any communication which is taking place. Some wireless communication systems, however, may not provide such an option. In connection with such systems, as well as in connection with systems which may provide such functionality, the security information processing system 311 may instead be configured to disrupt access by allowing any communication which is taking place to be completed, but by disrupting subsequently-initiated communications.

The security information processing system 311 may be configured to disrupt access by redirecting an addressed communication from the mobile communication device to a destination other than the one to which the communication was addressed. For example, the security information processing system 311 may be configured to disrupt access by redirecting an addressed communication from the mobile communication device to a pre-recorded message indicating that access has been disrupted. The pre-recorded message may also describe steps that may be taken to restore access. For example, the pre-recorded message may tell the user that he is being restricted because he is located nearby a secure facility and that he needs to move further away.

The security information processing system 311 may be configured to restore access after it has been disrupted. The security information processing system 311 may be configured to do so when the access control system 307 receives information indicating that the disrupted mobile communication device is at a location that is not near or within the security zone.

The access control system 307 may be configured to receive the information indicating that the mobile communication device is at a location which is not near or within the security zone from a source other than the security zone monitoring system. For example, the wireless communication system 301 may include a location-based system ("LBS") which is configured to determine the location of the mobile communication devices using any of a variety of technologies, such as GPS and/or triangulation.

Access to the wireless communication system 301 may be restored when a disrupted wireless communication device is no longer near the security zone. In such a case, the wireless communication device may no longer be detected by the security zone monitoring system. Thus, its attempted communication with the wireless communication system 301 may not be the subject of any communication from the security zone monitoring system to the security communication system 309.

On the other hand, this attempted communication may be received by the antenna system 303 in the wireless communication system 301. When the access control system 307 detects a communication from a wireless communication device which is not also reported by the security zone monitoring system, the security information processing system 311 may be configured to conclude that the wireless communication device is far from the security zone and, as a consequence, that its access to the wireless communication system 301 may be restored. The security information processing system 311 may then restore this access.

Figure 4:
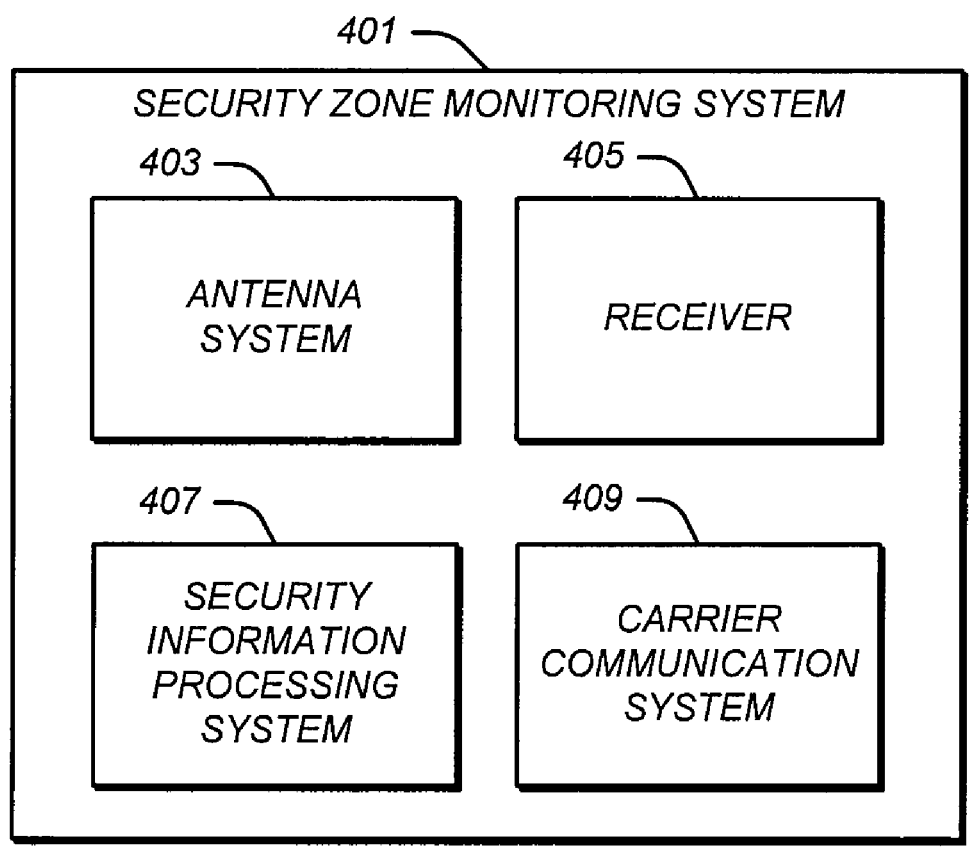
FIG. 4 illustrates another configuration for a security zone monitoring system.

FIG. 4 illustrates another configuration for a security zone monitoring system 401. As illustrated in FIG. 4, the security zone own monitoring system 401 may include an antenna system 403, a receiver 405, a security information processing system 407, and a carrier communication system 409.

The antenna system 403 and the receiver 405 may be the same as the antenna system 203 and the receiver 205 illustrated in FIG. 2 and discussed above.

The security information processing system 407 may be configured to perform one or more of the functions of the security information processing system 311 illustrated in FIG. 3 and described above. For example, the security information processing system 407 may be configured to determine whether a mobile communication device which is detected by the receiver 405 to be near or within the security zone should be granted access to a wireless communication system. It may be configured to do so based on any of the approaches discussed above in connection with the security information processing system 311.

One difference between the security zone monitoring system 401 and the security zone monitoring system 201 may be that access determinations may be made within the security zone monitoring system 401, as opposed to within the wireless communication system 301. In the embodiment illustrated in FIG. 4, for example, the carrier communication system 409 may be configured to merely issue instructions to the wireless communication system when the access of a particular mobile communication device should be disrupted and/or restored. The wireless communication system may be correspondingly configured to comply with these instructions.

One function of the security information processing system 311 which may not be replicated in the security information processing system 407 may be the automatic restoration function which has been described above, namely the restoration of access when the mobile communication device is detected by the wireless communication system 301 to be operating far from the security zone. The security zone monitoring system 401 may lack the capability to detect such a distant operation of the mobile communication device and, as a consequence, lack the ability to determine that the access of such a mobile communication device should be restored. The wireless communication system may in this instance contain the sub-system which is necessary for restoring the access, as has been described above in connection with the access control system 307.

The various systems and subsystems which have been described may effectively regulate access by mobile communication devices that are near or within a security area, without issuing any type of jamming signal, without transmitting radio signals, without requiring any wireless communication device to be confiscated, and without requiring the precise position of wireless communication devices to be determined.

The wireless communication system may be configured to allow all calls to certain numbers to always be permitted and to be completed normally (such as calls to 911), regardless of the identity of the caller.

The various systems and subsystems which have been described, such as the security zone monitoring systems, wireless communication systems, antenna systems, receivers, carrier communication systems, access control systems, security communication systems, and security information processing systems, may be implemented with hardware configured to perform the functions which these systems and subsystems are described above as performing.

For example, the carrier communication systems and the security communication systems may utilize communication hardware configured to facilitate communications between the security zone monitoring systems and the wireless communication systems over a computer network, such as the internet, a WAN, a LAN, and/or a combination of these.

The security information processing systems, for example, may include one or more computers programmed with computer software containing one or more algorithms specifically configured to cause the security information processing systems to implement the functions of the security information processing systems which have been described above.

Computer-readable storage media, such as one or more hard disk drives, CDs, DVDs, ROMS, PROMS, ePROMS, and/or RAMS may contain computer programming instructions which, when executed by a computing system, cause the computing system to perform the functions which have been described herein, such as to cause the security information processing systems which have been described herein to perform the functions which have been described herein for these systems.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the systems which have been described may be implemented with only a single security zone treated in the manner discussed above for the medium security zone 123. Such a configuration may be useful, for example, where a secure facility is immediately adjacent to public areas, such as a holding cell near in a court house.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. An access control system for controlling access to a wireless communication system by mobile communication devices while near or within a security zone comprising:
   a security communication system configured to receive communications from a security zone monitoring system indicating the identity of each mobile communication device which has been detected and whether the mobile communication device is near or within the security zone; and
   a security information processing system configured to disrupt access to the wireless communication system by each mobile communication device in ways which differ depending on whether a communication from the security zone monitoring system indicates that the mobile communication device is near or within the security zone, and on whether or not the mobile communication device has participated in at least a pre-determined number of separately-established communications while near or within the security zone.

2. The access control system of claim 1 wherein the security information processing system is configured to disrupt access if a communication from the security zone monitoring system indicates that the mobile communication device is within the security zone and the mobile communication device is not on an allow-access list.

3. The access control system of claim 1 wherein the security information processing system is configured to allow access if a communication from the security zone monitoring system indicates that the mobile communication device is near but not within the security zone, unless the mobile communication device is on a disrupt-access list.

4. The access control system of claim 1 wherein the security information processing system is configured to disrupt access if a communication from the security zone monitoring system indicates that the mobile communication device is near but not within the security zone, unless the mobile communication device is on an allow-access list.

5. The access control system of claim 1 wherein the security information processing system is configured to allow access if communications from the security zone monitoring system indicate that the mobile communication device has been near but not within the security zone, unless the communications indicate that the mobile communication device has participated in at least a pre-determined number of separately-established communications while near or within the security zone.

6. The access control system of claim 1 wherein the security information processing system is configured to allow access if communications from the security zone monitoring system indicate that the mobile communication device is near but not within the security zone, unless the communications indicate that access should be disrupted based on application of an algorithm to the communications.

7. The access control system of claim 1 wherein the security information processing system is configured to restore access after it has been disrupted when the access control system receives information indicating that the mobile communication device is at a location which is not near or within the security zone.

8. The access control system of claim 7 wherein the security information processing system is configured to receive the information indicating that the mobile communication device is at a location which is not near or within the security zone from a source other than the security zone monitoring system.

9. The access control system of claim 1 wherein the security information processing system is configured to disrupt access by taking down any communication which is taking place.

10. The access control system of claim 1 wherein the security information processing system is configured to disrupt access by allowing any communication which is taking place to be completed, but by disrupting subsequently-initiated communications.

11. The access control system of claim 1 wherein the security information processing system is configured to disrupt access by redirecting an addressed communication from the mobile communication device to a destination other than the one to which the communication was addressed.

12. The access control system of claim 11 wherein the security information processing system is configured to disrupt access by redirecting an addressed communication from the mobile communication device to a pre-recorded message indicating that access has been disrupted.

13. The access control system of claim 12 wherein the pre-recorded message indicates steps that may be taken to restore access.

14. An access control system for controlling access to a wireless communication system by mobile communication devices while near or within a security zone comprising:
   a security communication system configured to receive communications from a security zone monitoring system indicating the identity of each mobile communication device which has been detected, and whether the mobile communication device is near or within the security zone; and
   a security information processing system configured to disrupt access to the wireless communication system by each mobile communication device in ways which differ depending on whether a communication from the security zone monitoring system indicates that the mobile communication device is near or within the security zone, and on whether the mobile communication device has been near or within the security zone for at least a pre-determined period.

15. The access control system of claim 14 wherein the security information processing system is configured to allow access if communications from the security zone monitoring system indicate that the mobile communication device is near but not within the security zone, unless the communications indicate that the mobile communication device has been near or within the security zone for at least the pre-determined period, wherein the pre-determined period is five minutes or more.

16. The access control system of claim 15 wherein the pre-determined period is six hours or more.

17. A security zone monitoring system for controlling access to a regional cellular communication network by mobile communication devices while near or within a security zone comprising:
   an antenna system configured to receive signals from the mobile communication devices;
   a receiver configured to detect signals from the mobile communication devices and to extract therefrom information indicative of the identity of each detected mobile communication device and whether the mobile communication device is near or within the security zone; and
   a carrier communication system configured to communicate information to an access control system of the regional cellular communication network indicative of the identity of each mobile communication device which has been detected, whether the mobile communication device is near or within the security zone, and whether or not the mobile communication device has participated in at least a pre-determined number of separately-established communications while near or within the security zone.

18. The security zone monitoring system of claim 17 wherein the receiver is not configured to indicate the absolute location of each mobile communication device, but only whether the location is near or within the security zone.

19. A security zone monitoring system for controlling access to a wireless communication system by mobile communication devices while near or within a security zone comprising:
   an antenna system configured to receive signals from the mobile communication devices;
   a receiver configured to detect signals from the mobile communication devices and to extract therefrom device information indicative of the identity of each detected mobile communication device and whether the mobile communication device is near or within the security zone;
   a security information processing system configured to process the device information and, based thereon, to generate access information indicative of whether access to the wireless communication system by each detected mobile communication device should be disrupted in ways which differ depending on whether the device information indicates that the detected mobile communication device is near or within the security zone, and whether or not the mobile communication device has participated in at least a pre-determined number of separately-established communications while near or within the security zone; and
   a carrier communication system configured to communicate the access information to the wireless communication system.

20. Computer-readable storage media containing computer programming instructions which, when executed by a wireless communication system, cause the wireless communication system to control access to the wireless communication system by mobile communication devices while near or within a security zone by:
   receiving communications from a security zone monitoring system indicating the identity of each mobile communication device which has been detected and whether the mobile communication device is near or within the security zone; and
   disrupting access to the wireless communication system by each mobile communication device in ways which differ depending on whether a communication from the security zone monitoring system indicates that the mobile communication device is near or within the security zone, and on whether or not the mobile communication device has participated in at least a pre-determined number of separately-established communications while near or within the security zone.

21. Computer-readable storage media containing computer programming instructions which, when executed by a security zone monitoring system, cause the security zone monitoring system to control access to a wireless communication system by mobile communication devices while near or within a security zone by:
   detecting signals from the mobile communication devices;
   extracting therefrom information indicative of the identity of each detected mobile communication device and whether the mobile communication device is near or within the security zone; and
   communicating information to an access control system indicative of the identity of each mobile communication device which has been detected, whether the mobile communication device is near or within the security zone, and whether or not the mobile communication device has participated in at least a pre-determined number of separately-established communications while near or within the security zone.

22. Computer-readable storage media containing computer programming instructions which, when executed by a security zone monitoring system, cause the security zone monitoring system to control access to a wireless communication system by mobile communication devices while near or within a security zone by:
   detecting signals from the mobile communication devices;
   extracting therefrom device information indicative of the identity of each detected mobile communication device and whether the mobile communication device is near or within the security zone;
   processing the device information and, based thereon, generating access information indicative of whether access to the wireless communication system by each detected mobile communication device should be disrupted in ways which differ depending on whether the device information indicates that the detected mobile communication device is near or within the security zone, and whether or not the mobile communication device has participated in at least a pre-determined number of separately-established communications while near or within the security zone; and
   communicating the access information to the wireless communication system.

* * * * *